(12) United States Patent
Ma et al.

(10) Patent No.: US 12,190,085 B2
(45) Date of Patent: Jan. 7, 2025

(54) ANNOTATION AWARE EFFICIENT APPLICATION BUILD MANAGEMENT

(71) Applicant: Dell Products L.P., Round Rock, TX (US)

(72) Inventors: Guoqiang Ma, Shanghai (CN); Dazhi Dong, Shanghai (CN); Daniel K O'Reilly, Jr., Framingham, MA (US)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 18/162,810

(22) Filed: Feb. 1, 2023

(65) Prior Publication Data

US 2024/0256236 A1   Aug. 1, 2024

(51) Int. Cl.
*G06F 8/41* (2018.01)
*G06F 8/65* (2018.01)
*G06F 8/73* (2018.01)

(52) U.S. Cl.
CPC ............. *G06F 8/443* (2013.01); *G06F 8/65* (2013.01); *G06F 8/73* (2013.01)

(58) Field of Classification Search
USPC ................................................. 717/151–161
See application file for complete search history.

(56) References Cited

U.S. PATENT DOCUMENTS

| | | | |
|---|---|---|---|
| 7,565,364 B1* | 7/2009 | Darcy | G06F 8/30 |
| 7,840,939 B1* | 11/2010 | Chinnici | G06F 8/73 |
| | | | 717/118 |
| 7,966,602 B1* | 6/2011 | Webster | G06F 8/423 |
| | | | 717/114 |
| 2006/0123332 A1* | 6/2006 | Berg | G06F 40/169 |
| | | | 715/205 |
| 2008/0022260 A1* | 1/2008 | Kinder | G06F 9/449 |
| | | | 717/116 |
| 2009/0240989 A1* | 9/2009 | Yokoyama | G06F 11/3664 |
| | | | 714/E11.029 |
| 2018/0081677 A1* | 3/2018 | Gibbons | G06F 8/41 |
| 2019/0114165 A1* | 4/2019 | Ghiondea | G06F 8/71 |

* cited by examiner

*Primary Examiner* — Qing Chen
(74) *Attorney, Agent, or Firm* — Krishnendu Gupta; Deepika Bhayana; Derek Lam (57) ABSTRACT

Techniques are disclosed for annotation-aware efficient application build management. For example, a system can include at least one processing device including a processor coupled to a memory, the at least one processing device being configured to perform the following steps: identifying a list of annotation processor files from a plurality of source code files to generate an annotation processor list; triggering annotation processing using one or more annotation processor files in the annotation processor list, while deferring compilation of remaining source code files in the plurality of source code files; and recompiling incrementally any output from the annotation processing and any of the remaining source code files that were updated from a previous compilation without triggering a full recompilation of the plurality of source code files.

20 Claims, 5 Drawing Sheets

ANNOTATION AWARE EFFICIENT APPLICATION BUILD MANAGEMENT

FIELD

Embodiments of the present invention generally relate to application build systems, e.g., specialized computer systems for creating new versions of complex computer applications. More specifically, at least some embodiments relate to systems, hardware, software, computer-readable media, and methods for managing application builds using annotation processors.

BACKGROUND

Application build systems generally support two approaches to build an application project, e.g., so as to generate new versions of complex computer applications. One approach is a full build, which rebuilds the complete set of application artifacts and intermediate objects for each invocation. The other approach is an incremental build, which leverages results and assets from a previous build, and only rebuilds based on source code files that have changed.

In many instances, a developer or computer programmer merely changes a small part of the application project and conducts an incremental build to check if the source code change works correctly. Accordingly, reducing build times can help to save developer time and improve development efficiency.

SUMMARY

In one embodiment, a system comprises at least one processing device including a processor coupled to a memory, the at least one processing device being configured to perform the following steps: identifying a list of annotation processor files from a plurality of source code files to generate an annotation processor list; triggering annotation processing using one or more annotation processor files in the annotation processor list, while deferring compilation of remaining source code files in the plurality of source code files; and recompiling incrementally any output from the annotation processing and any of the remaining source code files that were updated from a previous compilation without triggering a full recompilation of the plurality of source code files.

In some embodiments, identifying the list of annotation processor files further includes scanning the plurality of source code files to include only isolating annotation processors, wherein the isolating annotation processors are configured to process annotated elements in the plurality of source code files in isolation. Scanning the plurality of source code files can further include searching each source code file for a predetermined string. Identifying the list of annotation processor files can further include, prior to searching each source code file, scanning the plurality of source code files to include only source code files that have been created, modified, or deleted since a previous build. Triggering the annotation processing can further include invoking a compiler to perform annotation processing only, while deferring compilation of the remaining source code files. Triggering the annotation processing can further include invoking the compiler with a "proc:only" option. Triggering the annotation processing can further include performing annotation processing using a first annotation processor file in the annotation processor list. Recompiling incrementally any output from the annotation processing and any of the remaining source code files can further include invoking a compiler to perform recompilation only, without further annotation processing. Recompiling incrementally any output from the annotation processing and any of the remaining source code files can further include invoking the compiler with a "proc:none" option. The annotation processor list can include a subset of the plurality of source code files. The source code files can include Java files. Recompiling incrementally can exhibit improved build speed over the full recompilation.

Other example embodiments include, without limitation, apparatus, systems, methods, and computer program products comprising processor-readable storage media.

Other aspects of the invention will be apparent from the following description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

To easily identify the discussion of any particular element or act, the most significant digit or digits in a reference number refer to the figure number in which that element is first introduced.

In the drawings.

DETAILED DESCRIPTION

Embodiments of the present invention generally relate to application build systems, e.g., specialized computer systems for creating new versions of complex computer applications. More specifically, at least some embodiments relate to systems, hardware, software, computer-readable media, and methods for managing application builds using annotation processors.

Disclosed herein are techniques for annotation-aware application build management. In example embodiments, the present build system is configured to generate an annotation processor list from a plurality of source code files. The present build system is configured to trigger annotation processing for one or more annotation processors in the annotation processor list, while deferring compilation of remaining source code files. The present build system is configured to recompile incrementally any output from the annotation processing and any of the remaining source code files that were updated from a previous compilation, without triggering a full recompilation of the plurality of source code files.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
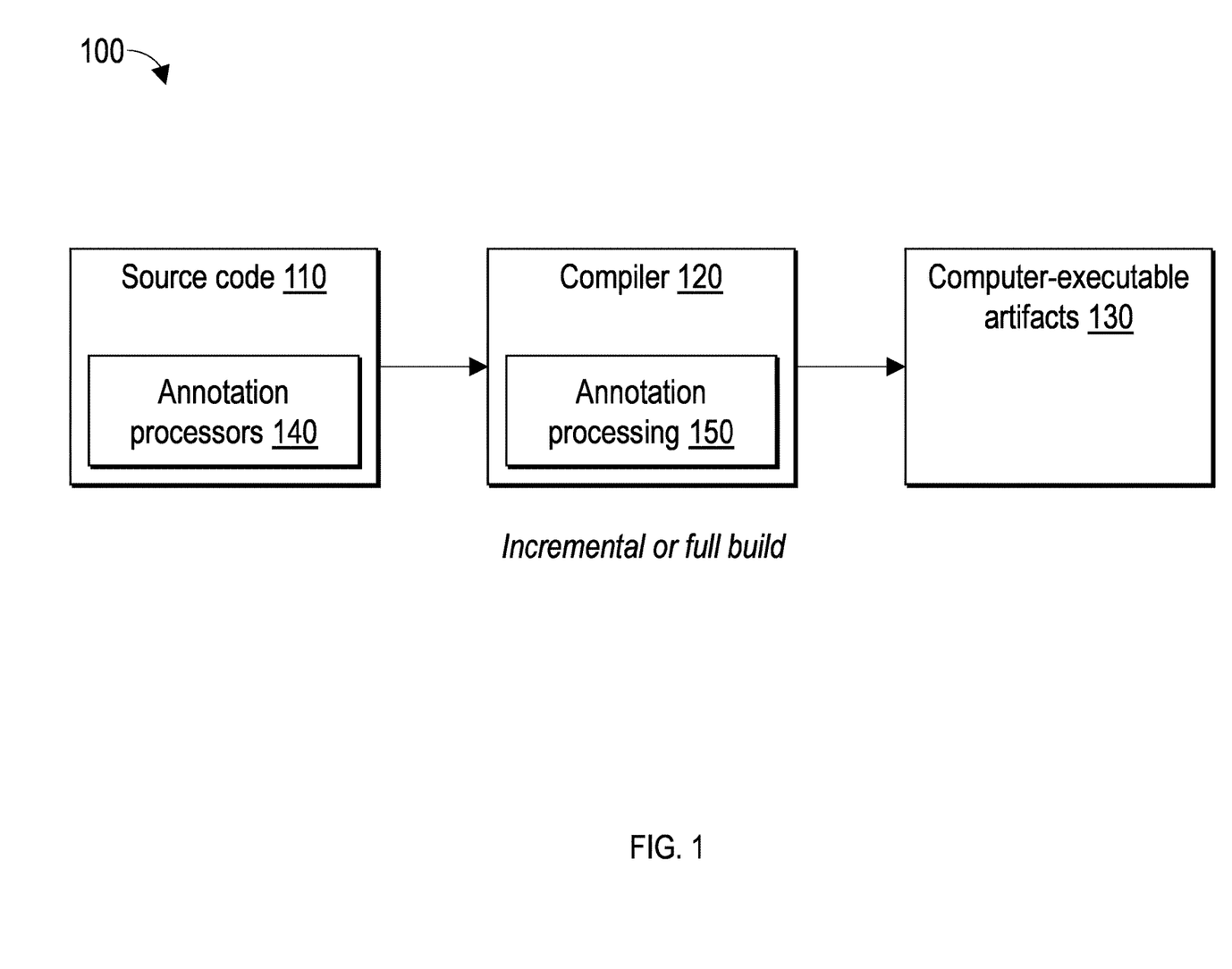
FIG. 1 illustrates aspects of a build system in accordance with example embodiments.

FIG. 1 shows aspects of a build system in accordance with example embodiments. In particular, FIG. 1 illustrates a build system 100 configured to process source code 110 as input and generate computer-executable artifacts 130 (e.g., applications). The build system is configured to use a compiler 120 to improve build durations by shortening overall build times when generating the computer-executable artifacts.

The source code 110 generally includes a plurality of source code files. The files can include commands written using a human-readable programming language, usually as plain text. Example embodiments can be written in, but are not limited to, the Java programming language provided by Oracle Corporation.

Programming languages, such as Java, generally support annotations. As used herein, annotations refer generally to syntactic metadata that can be added to source code, such as Java source code files. For example, in the Java programming language, source code elements such as classes, methods, variables, parameters, and packages are able to have associated annotations. Example annotations include, but are not limited to, @Override, @Deprecated, @SuppressWarnings, @FunctionalInterface, @Repeatable, and the like. For example, @Deprecated, as applied to a method declaration, operates to annotate the method as obsolete (resulting in a compiler warning if other source code 110 invokes the deprecated method). More generally, annotations provide information to a program at compile time or at runtime, based on which the program can take further action.

Organizations can also define custom annotations. Advantageously, custom annotations allow an organization to, for example:
  reduce repetition,
  automate generation of boilerplate code,
  identify errors at compile time, such as potential null pointer checks, or
  customize runtime behavior based on the presence of a custom annotation.

The source code 110 can include the annotation processors 140. The annotation processors can be source code written to process annotations, such as custom annotations. In example embodiments, the annotation processors can generally be implemented as compiler plugins. Since these annotation processors can be defined and provided by organizations, they can be configured to perform desired custom operations. For example, the annotation processors can configured to produce and output informational messages at compile time or at runtime. In additional embodiments, the annotation processors can be configured to generate additional source files or resources, which in turn may be compiled and processed.

Some embodiments of the annotation processors 140 can be characterized by the compiler 120. In example embodiments the compiler can include a Gradle build engine for Java projects. In Gradle, a given annotation processor can be characterized as isolating or aggregating. An isolating annotation processor generally refers to an annotation processor configured to process annotated elements in the plurality of source code files in isolation. An aggregating annotation processor generally refers to an annotation processor configured to aggregate several source files into one or more output files or validation messages.

Example embodiments of the computer-executable artifacts 130 can generally include application object code (e.g., binary code) that the compiler 120 is configured to generated based on the source code 110, as described in further detail below. The computer-executable artifacts can also include intermediate objects.

The compiler 120 is configured to compile the source code files 110 and generate the computer-executable artifacts 130. Compilation can generally involve multiple iterations, for example in response to computer programmers providing updated source code to the build system 100. Compilers, such as the Java compiler provided by Oracle Corporation, can be configured to perform incremental builds or full builds.

As used herein, an "incremental" recompilation (sometimes also referred to as an "incremental compile," "incremental build," or "incremental rebuild") refers to recompiling the source code files 110 in a subsequent iteration, while advantageously leveraging at least some results from a previous compilation, such as previously generated application artifacts or intermediate objects. In contrast, a "full" recompilation (sometimes also referred to as a "full compile," "full build," or "full rebuild") refers to compiling the source code files without leveraging any results from a previous compilation. Advantageously, an incremental build of source code files can greatly reduce build time compared to a full build. For example, an incremental build can exhibit build times on the order of several seconds, compared with a full build that may require several minutes.

The compiler 120 can include an annotation processing stage 150 during the course of a build. In example embodiments, the annotation processing can be performed in multiple rounds, each invoking one or more of the annotation processors 140. For example, each round starts with the compiler searching for given annotations included in the source code files 110 and selecting the annotation processors suitable for these resulting annotations. The compiler invokes, in turn, each annotation processor to process the corresponding source code that includes the annotations.

In one or more example embodiments, during annotation processing 150 the compiler 120 can be configured to enforce requirements on the annotation processors 140. These requirements can help ensure build correctness. If the compiler determines that any given annotation processor fails to comply with these rules, the result can be that the compiler performs a full build instead of an incremental build, having the undesired effect of greatly slowing build time overall.

By way of example, in some embodiments the Gradle build engine can require isolating annotation processors 140 to reference only approved interfaces and avoid dependencies on compiler-specific APIs. For example, a given isolating annotation processor may only be allowed to depend on certain approved interfaces such as javax.annotation.processing.Filer. An annotation processor implementing the Filer interface generally supports the creation of new files, which represents an operation that can be generally allowed by the build engine. Additionally, new files that are generated from an annotation processor implementing the Filer interface can advantageously generally be known to the annotation processor, for example, for further processing or identification to the compiler 120. In contrast, the compiler may disallow dependencies on compiler-specific APIs, such as com.sun.source.util.Trees. In some embodiments if the compiler identifies annotation processors that fail to adhere to such predetermined requirements, then the compiler may perform a full build instead of an incremental build, thereby undesirably slowing build time.

Figure 2:
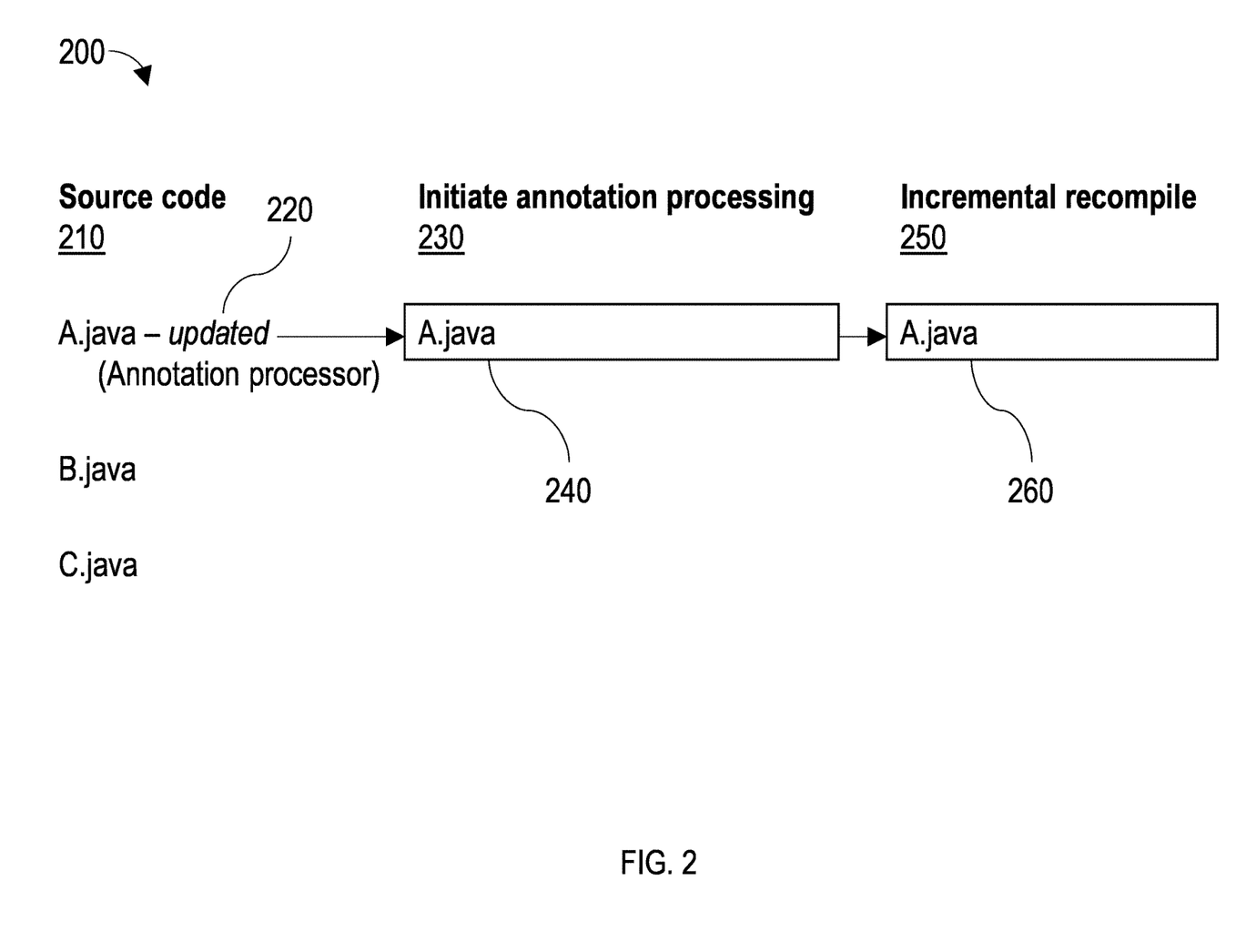
FIGS. 2-3 illustrate aspects of annotation-aware builds in accordance with example embodiments.

FIG. 2 illustrates aspects of an annotation-aware build 200 in accordance with example embodiments. The example build can be performed by, for example, the present build system.

Source code files 210 can include A.java, B.java, and C.java, by way of example. B.java and C.java can be conventional Java source files, and A.java can define an annotation processor.

The present build system is configured to identify a list of updated annotation processors from the source code list 210, to generate an annotation processor list 240. In this example, the annotation processor list includes A.java since A.java defines an annotation processor and A.java is determined to have been updated 220.

In some embodiments, generating the annotation processor list can include scanning the source code list 210 to include only source code that has been created, modified, or deleted since the previous build. For example, the search can analyze filesystem metadata for creation, modification, and deletion attributes and timestamps. The search can further include source code files having a pre-determined string. For example, the string can include isolating annotation processors previously identified to trigger the build engine to execute an undesirable full build rather than an incremental build. One example string includes, but is not limited to, "@VertxGen." In further embodiments, the search can identify only annotation processors that meet predetermined criteria, such as annotation processors characterized as isolating. In further embodiments, the search can terminate upon identifying at least one annotation processor that meets the predetermined criteria.

The present build system is configured to initiate annotation processing 230 using the annotation processor list 240. In example embodiments, initiating annotation processing can include providing the annotation processor list to the compiler, and invoking the compiler with an option to initiate application processing only, e.g., while deferring compilation of remaining source code that has been updated in the source code list 210. For example, for the Java compiler javac, a "proc:only" option can be invoked along with the annotation processor list 240 that includes A.java in the illustrated example. In further embodiments, if the annotation processor list is empty, then initiating application processing can be skipped. If A.java is an isolating annotation processor configured to generate source code such as stub Java source code files resulting from the annotation, then such source code files will be present for the build system following this annotation processing.

The present build system is configured to initiate an incremental recompile 250. The incremental recompile can include an incremental build of any output from the annotation processing along with any of the remaining source code files identified as updated from a previous compilation in the source code list. The output from the annotation processing can include, for example, any generated stub Java source code associated with the updated annotation processor in A.java 260. The incremental recompile can avoid initiating annotation processing (which was performed in step 230) and advantageously avoid triggering a full build of the source code 210. In the illustrated example, only generated Java source code associated with the updated annotation processor in A.java is incrementally rebuilt, thereby avoiding a full build that would recompile B.java and C.java as well. In some embodiments, initiating an incremental recompile can include, for the Java compiler javac, invoking a "proc:none" option so as to trigger incremental recompilation only while disabling annotation processing.

Figure 3:
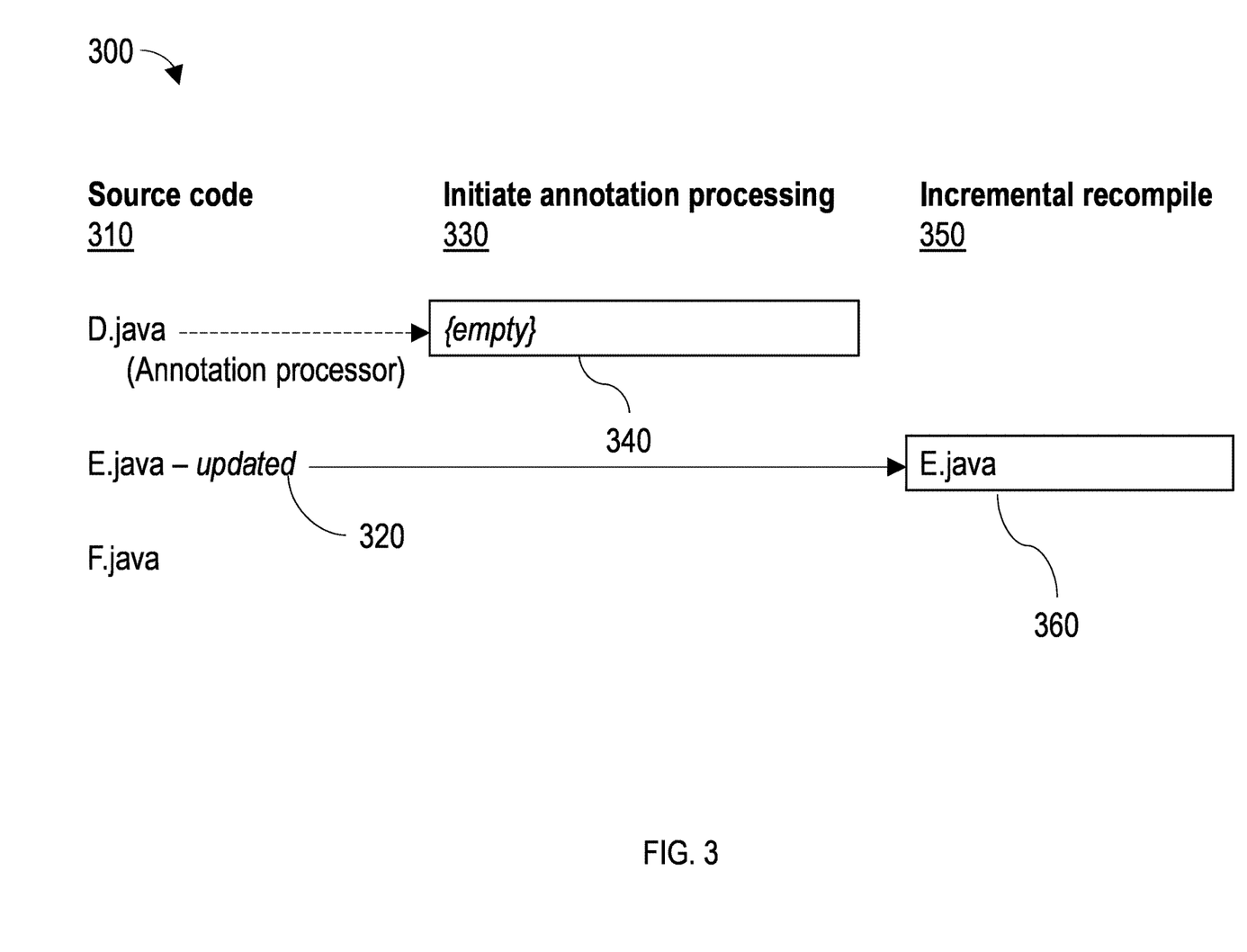

FIG. 3 illustrates aspects of an annotation-aware build 300 in accordance with example embodiments. The example build can be performed by, for example, the present build system.

Source code files 310 can include D.java, E.java, and F.java, by way of example. E.java and F.java can be conventional Java source files, and D.java can define an annotation processor.

The present build system is configured to generate a list 340 of updated annotation processors from the source code list 310. In this example, the annotation processor list is empty. Although D.java defines an annotation processor, D.java is unchanged from a previous compilation. Instead, only E.java is determined to be updated 320.

The present build system is configured to initiate annotation processing 330 using the annotation processor list 340. As described, if the annotation processor list is empty, then initiating application processing can be skipped, advantageously resulting in shorter build time.

The present build system is configured to initiate an incremental recompile 350. The incremental recompile can include an incremental build of any output from the annotation processing along with any of the remaining source code files identified as updated from a previous compilation in the source code list. The incremental recompile can avoid initiating annotation processing (which was performed in step 330) and advantageously avoid triggering a full build of the source code 310. In the illustrated example, only the updated source code E.java is incrementally rebuilt 360, thereby avoiding a full build that would recompile D.java and F.java as well. In some embodiments, initiating an incremental recompile can include, for the Java compiler javac, invoking a "proc:none" option so as to trigger incremental recompilation only while disabling annotation processing.

Figure 4:
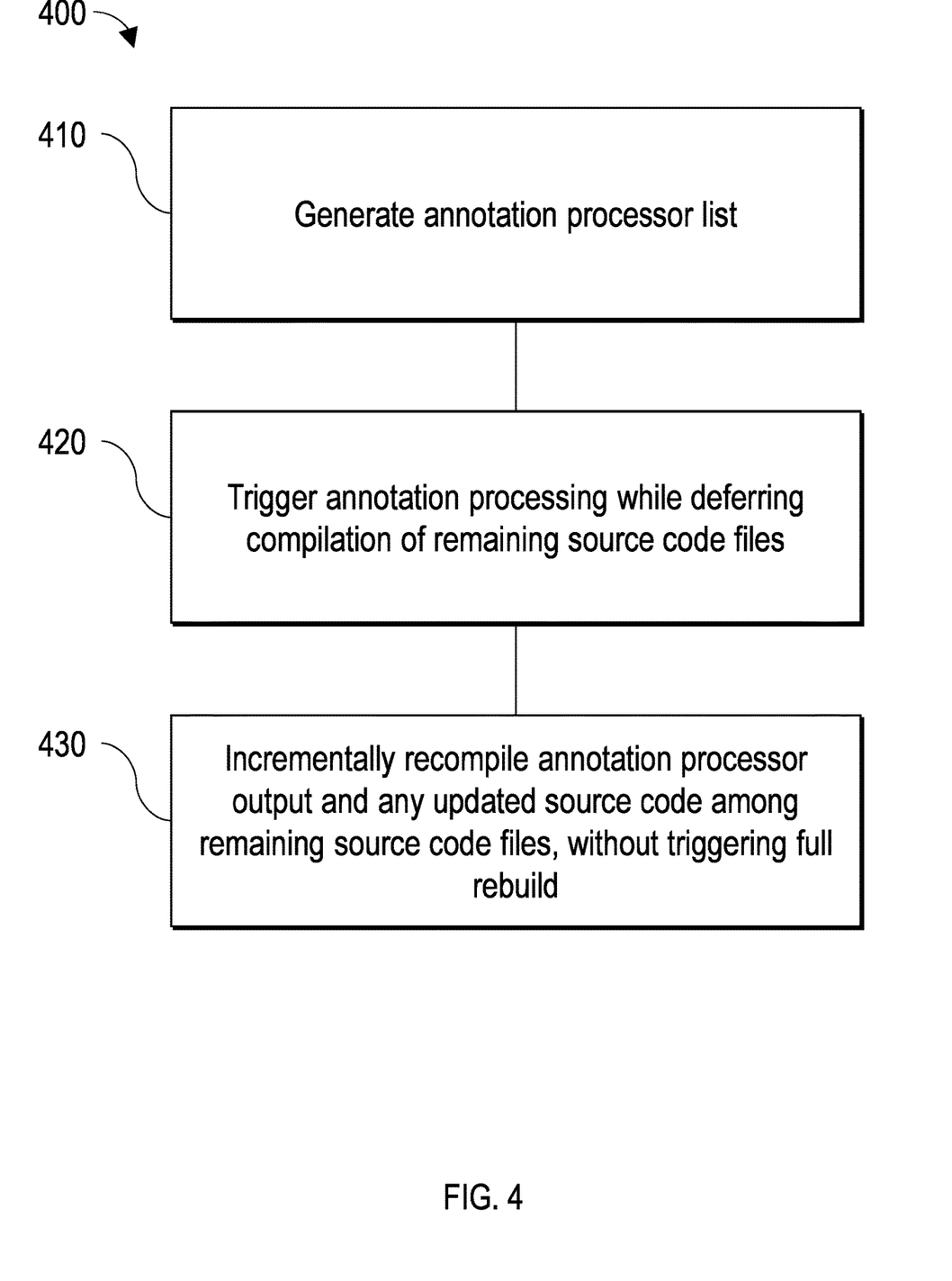
FIG. 4 illustrates aspects of methods for annotation-aware builds in accordance with example embodiments.

FIG. 4 illustrates aspects of a method 400 in accordance with example embodiments.

In example embodiments, the method 400 includes identifying a list of annotation processor files from a plurality of source code files to generate an annotation processor list (step 410). In some embodiments, identifying the annotation processor list further includes scanning the plurality of source code files to include only isolating annotation processors. The isolating annotation processors can be configured to process annotated elements in the plurality of source code files in isolation. Scanning the plurality of source code files can further include searching each source code file for a predetermined string. In some embodiments, identifying the annotation processor list further includes, prior to searching each source code file, scanning the plurality of source code files to include only source code files that have been created, modified, or deleted since the previous build. The annotation processor list can include a subset of the plurality of source code files. The source code files can be Java files.

In example embodiments, the method 400 includes triggering annotation processing using one or more annotation processor files in the annotation processor list, while deferring compilation of remaining source code files in the plurality of source code files (step 420). In some embodiments, triggering the annotation processing can include invoking a compiler to perform annotation processing only, while deferring compilation of the remaining source code files. For example, triggering the annotation processing can include invoking the compiler with a "proc:only" option.

Triggering the annotation processing can include performing annotation processing using the first annotation processor file in the annotation processor list.

In example embodiments, the method 400 includes recompiling incrementally any output from the annotation processing and any of the remaining source code files that were updated from a previous compilation without triggering a full recompilation of the plurality of source code files (step 430). In some embodiments, recompiling incrementally any output from the annotation processing files and any of the remaining source code files can include invoking a compiler to perform recompilation only, without further annotation processing. For example, recompiling incrementally any output from the annotation processing files and any of the remaining source code files can include invoking the compiler with a "proc:none" option. In some embodiments, recompiling incrementally can exhibit improved build speed over the full recompilation.

While the various steps in the example method 400 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 400 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

As mentioned, at least portions of the build system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 5. Although described in the context of system 100, these platforms may also be used to implement at least portions of other information processing systems in other embodiments.

Figure 5:
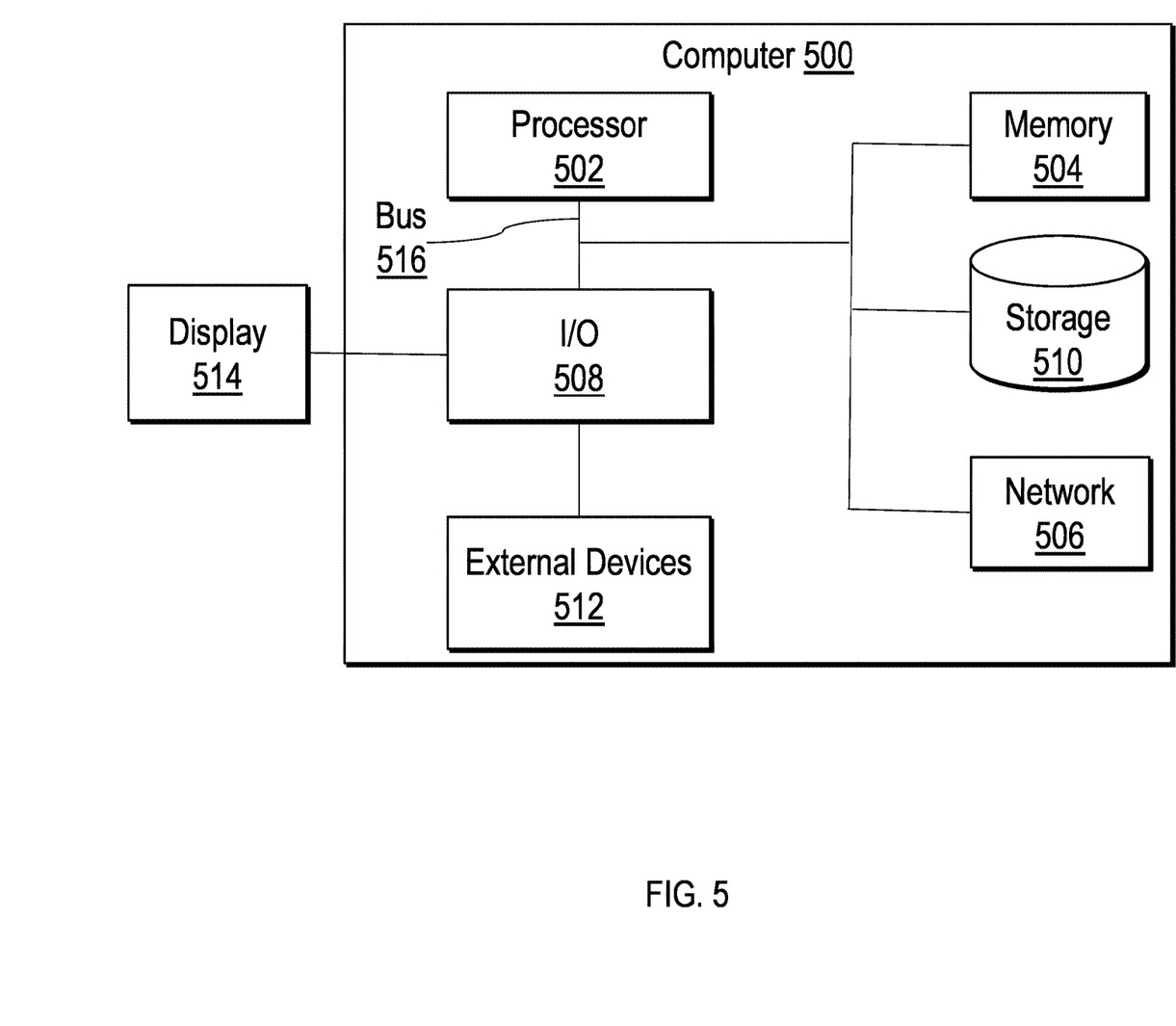
FIG. 5 illustrates aspects of a computing device or computing system in accordance with example embodiments.

FIG. 5 illustrates aspects of a computing device or a computing system in accordance with example embodiments. The computer 500 is shown in the form of a general-purpose computing device. Components of the computer may include, but are not limited to, one or more processors or processing units 502, a memory 504, a network interface 506, and a bus 516 that communicatively couples various system components including the system memory and the network interface to the processor.

The bus 516 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 500 typically includes a variety of computer-readable media. Such media may be any available media that is accessible by the computer system, and such media includes both volatile and non-volatile media, removable and non-removable media.

The memory 504 may include computer system readable media in the form of volatile memory, such as random-access memory (RAM) and/or cache memory. The computer system may further include other removable/non-removable, volatile/non-volatile computer system storage media. By way of example only, the storage system 510 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 516 by one or more data media interfaces. As has been depicted and described above in connection with FIGS. 1-4, the memory may include at least one computer program product having a set (e.g., at least one) of program modules that are configured to carry out the functions of the embodiments as described herein.

The computer 500 may also include a program/utility, having a set (at least one) of program modules, which may be stored in the memory 504 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 500 may also communicate with one or more external devices 512 such as a keyboard, a pointing device, a display 514, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 508. Still yet, the computer system may communicate with one or more networks such as a local area network (LAN), a general wide area network (WAN), and/or a public network (e.g., the Internet) via the network adapter 506. As depicted, the network adapter communicates with the other components of the computer system via the bus 516. It should be understood that although not shown, other hardware and/or software components could be used in conjunction with the computer system. Non-limiting examples include microcode, device drivers, redundant processing units, external disk drive arrays, Redundant Array of Independent Disk (RAID) systems, tape drives, data archival storage systems, etc.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

In the foregoing description of FIGS. 1-5, any component described with regard to a figure, in various embodiments of the invention, may be equivalent to one or more like-named components described with regard to any other figure. For brevity, descriptions of these components has not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n.". This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A system comprising:
   at least one processing device including a processor coupled to a memory;
   the at least one processing device being configured to implement the following steps:
      identifying a list of annotation processor files from a plurality of source code files to generate an annotation processor list;
      triggering annotation processing using one or more annotation processor files in the annotation processor list, while deferring compilation of remaining source code files in the plurality of source code files; and
      recompiling incrementally any output from the annotation processing and any source code file of the remaining source code files in the plurality of source code files that were updated from a previous compilation of the plurality of source code files without triggering a full recompilation of the plurality of source code files.

2. The system of claim 1, wherein identifying the list of annotation processor files further comprises:
   scanning the plurality of source code files to include only isolating annotation processors, wherein the isolating annotation processors are configured to process annotated elements in the plurality of source code files in isolation.

3. The system of claim 2, wherein scanning the plurality of source code files further comprises;
  searching each source code file in the plurality of source code files for a predetermined string.

4. The system of claim 3, wherein identifying the list of annotation processor files further comprises:
  prior to searching each source code file in the plurality of source code files for the predetermined string, scanning the plurality of source code files to include only source code files that have been created, modified, or deleted since a previous build.

5. The system of claim 1, wherein triggering the annotation processing further comprises:
  invoking a compiler to perform annotation processing only, while deferring compilation of the remaining source code files in the plurality of source code files.

6. The system of claim 5, wherein triggering the annotation processing further comprises:
  invoking the compiler with a "proc:only" option.

7. The system of claim 1, wherein triggering the annotation processing further comprises:
  performing annotation processing using a first annotation processor file in the annotation processor list.

8. The system of claim 1, wherein recompiling incrementally any output from the annotation processing and any source code file of the remaining source code files in the plurality of source code files further comprises;
  invoking a compiler to perform recompilation only, without further annotation processing.

9. The system of claim 8, wherein recompiling incrementally any output from the annotation processing and any source code file of the remaining source code files in the plurality of source code files further comprises:
  invoking the compiler with a "proc:none" option.

10. The system of claim 1, wherein the annotation processor list comprises a subset of source code files of the plurality of source code files.

11. The system of claim 1, wherein the plurality of source code files comprise Java files.

12. The system of claim 1, wherein recompiling incrementally exhibits improved build speed over the full recompilation of the plurality of source code files.

13. A method comprising:
  identifying a list of annotation processor files from a plurality of source code files to generate an annotation processor list;
  triggering annotation processing using one or more annotation processor files in the annotation processor list, while deferring compilation of remaining source code files in the plurality of source code files; and
  recompiling incrementally any output from the annotation processing and any source code file of the remaining source code files in the plurality of source code files that were updated from a previous compilation of the plurality of source code files without triggering a full recompilation of the plurality of source code files.

14. The method of claim 13, wherein identifying the list of annotation processor files further comprises;
  scanning the plurality of source code files to include only isolating annotation processors, wherein the isolating annotation processors are configured to process annotated elements in the plurality of source code files in isolation.

15. The method of claim 14, wherein scanning the plurality of source code files further comprises:
  scanning the plurality of source code files to include only source code files that have been created, modified, or deleted since a previous build; and
  searching each scanned source code file in the plurality of source code files for a predetermined string.

16. The method of claim 13, wherein triggering the annotation processing further comprises:
  invoking a compiler with a "proc:only" option to perform annotation processing only, while deferring compilation of the remaining source code files in the plurality of source code files.

17. The method of claim 13, wherein triggering the annotation processing further comprises:
  performing annotation processing using a first annotation processor file in the annotation processor list.

18. The method of claim 13, wherein recompiling incrementally any output from the annotation processing and any source code file of the remaining source code files in the plurality of source code files further comprises;
  invoking a compiler with a "proc:none" option to perform recompilation only, without further annotation processing.

19. The method of claim 13, wherein the annotation processor list comprises a subset of source code files of the plurality of source code files.

20. A non-transitory processor-readable storage medium having stored thereon program code of one or more software programs, wherein the program code of the one or more software programs when executed by at least one processing device causes the at least one processing device to perform the following steps:
  identifying a list of annotation processor files from a plurality of source code files to generate an annotation processor list;
  triggering annotation processing using one or more annotation processor files in the annotation processor list, while deferring compilation of remaining source code files in the plurality of source code files; and
  recompiling incrementally any output from the annotation processing and any source code file of the remaining source code files in the plurality of source code files that were updated from a previous compilation of the plurality of source code files without triggering a full recompilation of the plurality of source code files.

* * * * *